United States Patent [19]

Howard

[11] Patent Number: 4,635,219

[45] Date of Patent: Jan. 6, 1987

[54] PRINTING CALCULATOR

[76] Inventor: Lawrence K. Howard, 13015 Willard, North Hollywood, Calif. 91605

[21] Appl. No.: 536,631

[22] Filed: Sep. 28, 1983

[51] Int. Cl.[4] .......... G06F 3/12; B41J 3/36; G06K 3/12

[52] U.S. Cl. .......... 364/710; 235/432; 400/88

[58] Field of Search .......... 364/406, 408, 705, 710, 364/715; 400/78, 83, 88; 235/379, 432, 433

[56] References Cited

U.S. PATENT DOCUMENTS

| | | | |
|---|---|---|---|
| 2,980,226 | 4/1961 | Inoue | 400/88 |
| 3,842,248 | 10/1974 | Yarnell et al. | 235/432 |
| 3,920,979 | 11/1975 | Kilby et al. | 400/78 |
| 4,262,589 | 4/1981 | Gebhardt | 235/379 |
| 4,427,314 | 1/1984 | Fujiwara et al. | 400/88 |
| 4,433,925 | 2/1984 | Fujiwara et al. | 400/88 |
| 4,455,100 | 6/1984 | Bauer | 400/88 |

FOREIGN PATENT DOCUMENTS

| | | | |
|---|---|---|---|
| 2046671 | 11/1980 | United Kingdom | 400/88 |

*Primary Examiner*—James D. Thomas
*Assistant Examiner*—Dale M. Shaw
*Attorney, Agent, or Firm*—Roger A. Marrs

[57] ABSTRACT

A portable calculator and recordal device is disclosed herein which includes a pad of paper and an electronic calculator which is movably disposed over the pad on a sliding carriage in association with a printer whereby information entered into the calculator may be printed onto the paper. The sliding carriage is adapted for manual removal from the pad of paper for easy reference. Apparatus is provided for printing at variable heights as paper is expended. The device is especially useful for printing a variety of transactions on the paper and associated recordal sheets.

16 Claims, 10 Drawing Figures

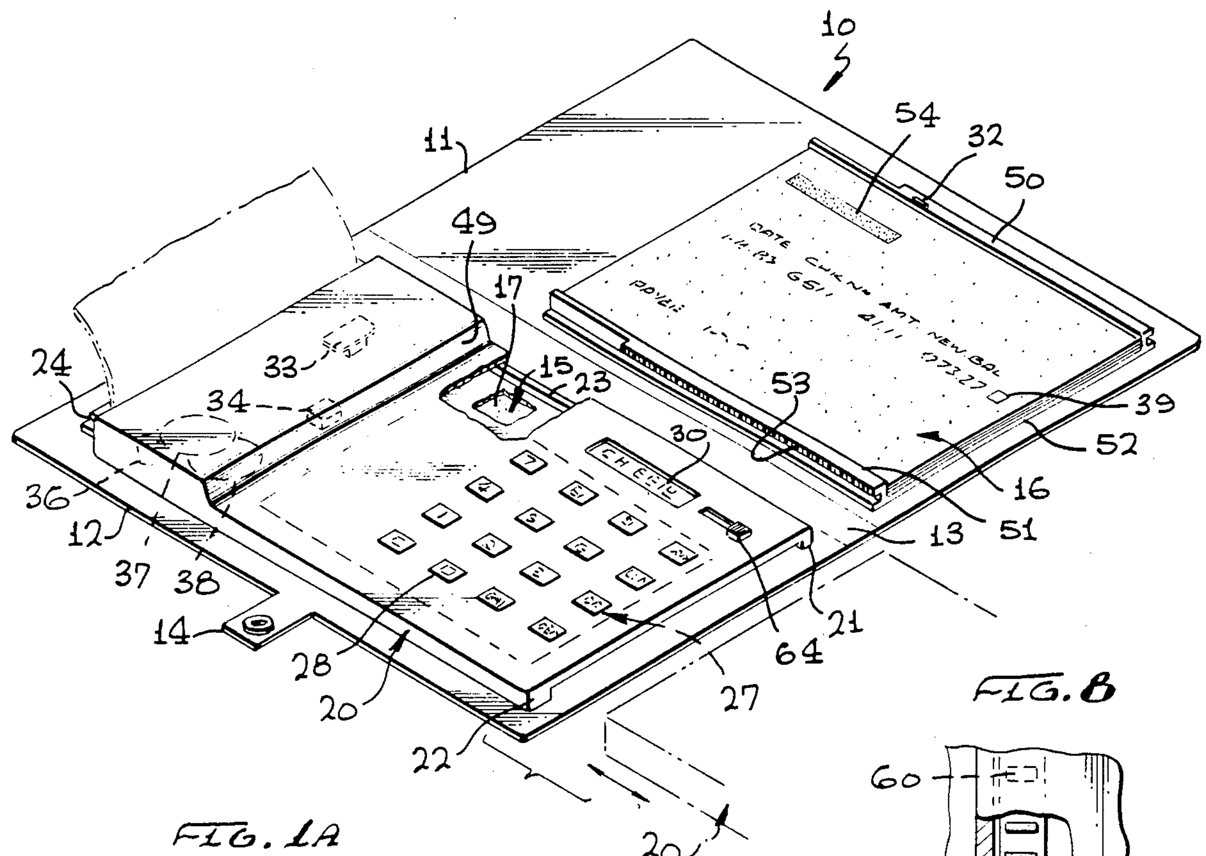
FIG. 1
10
11
54
32
50
49
17
15
23
24
33
34
30
53
39
52
16
36
12
13
51
37
38
21
14
28
64
27
20
22
20
FIG. 8
60
61
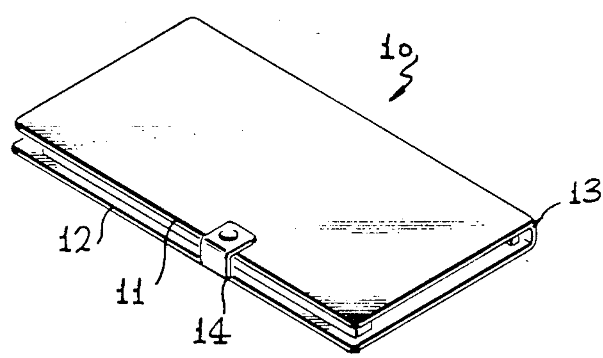
FIG. 1A
10
13
12
11
14
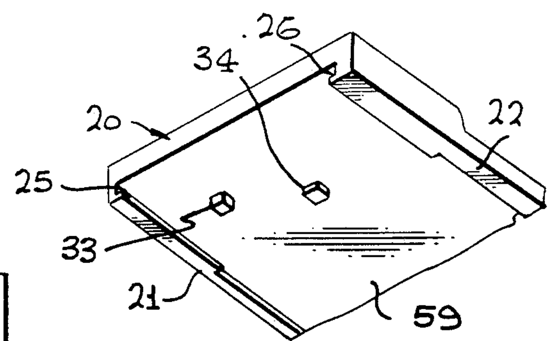
FIG. 6
26
34
22
20
25
33
21
59
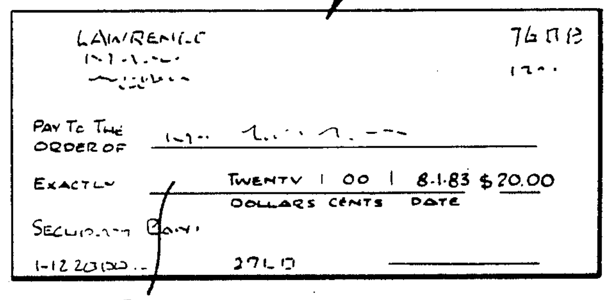
15
PAY TO THE ORDER OF
EXACTLY
TWENTY 00 8.1.83 $20.00
DOLLARS CENTS DATE
56
FIG. 2
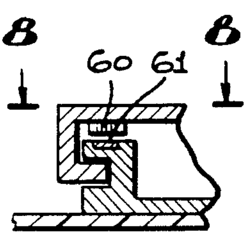
8
60 61
8
FIG. 7

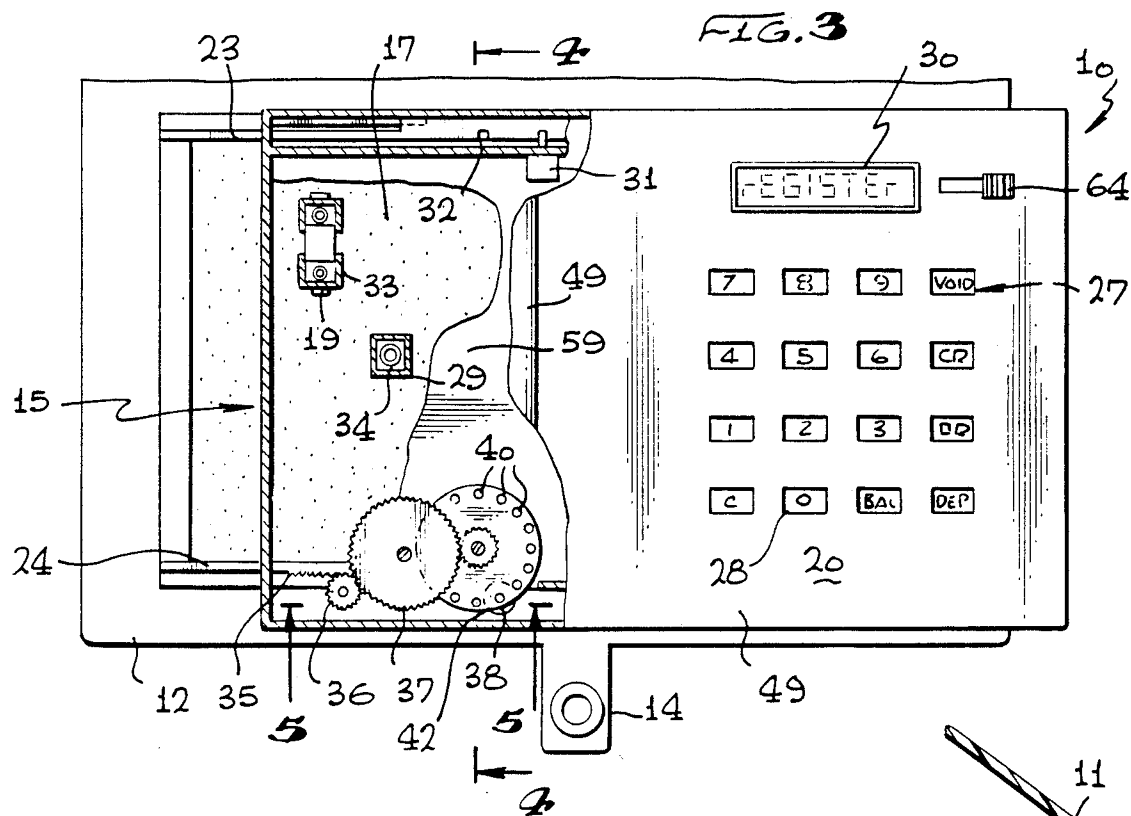
FIG. 3
REGISTER
7
8
9
VOID
4
5
6
CR
1
2
3
DR
C
0
BAL
DEP
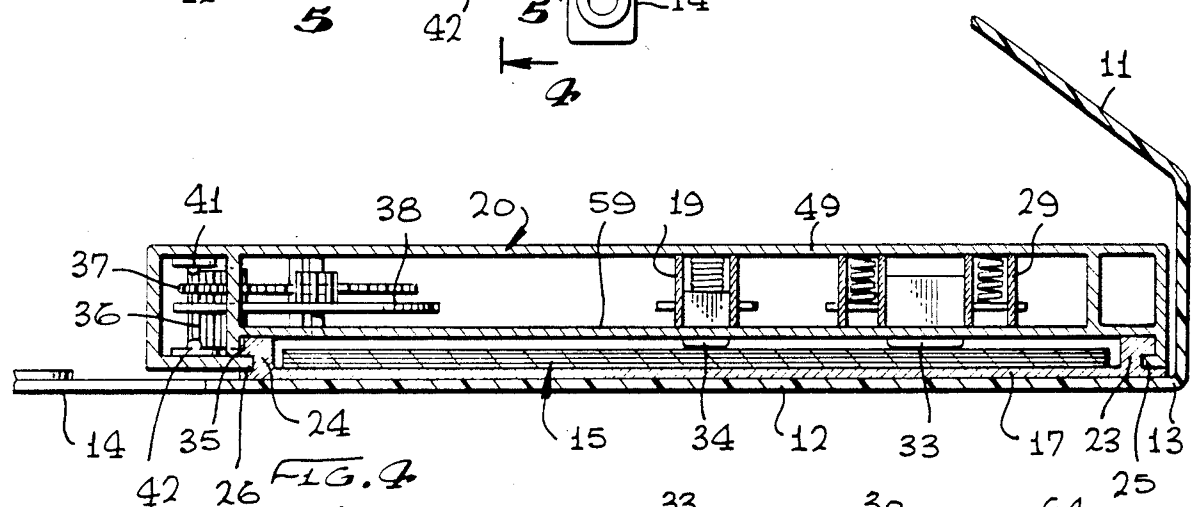
FIG. 4
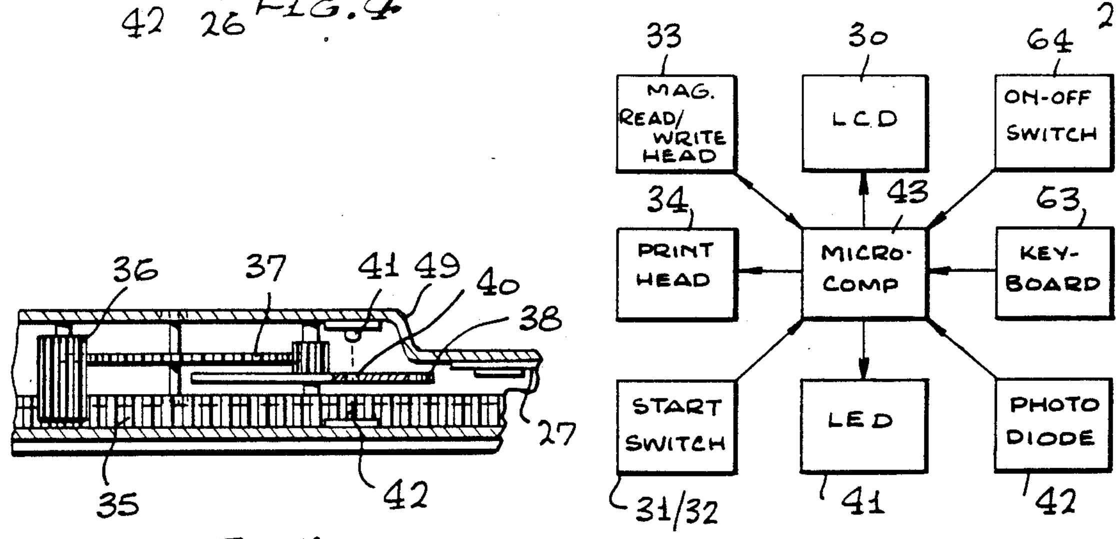
FIG. 5
MAG. READ/WRITE HEAD
LCD
ON-OFF SWITCH
PRINT HEAD
MICRO-COMP
KEY-BOARD
START SWITCH
LED
PHOTO DIODE
FIG. 9

PRINTING CALCULATOR

BACKGROUND OF THE INVENTION

1. Field of the Invention

The present invention relates to printing calculators and, more particularly, to a novel portable calculating and recording means wherein information may be printed on a pad of paper.

2. Brief Description of the Prior Art

In the past, conventional printing calculators have used a system of motor driven gears to move a printhead from side to side and to advance the paper in a paper roll. This is quite adequate for many purposes, especially when long columns of figures are to be tallied. However, in other instances, it has several disadvantages. The paper roll, motor and batteries consume a certain amount of bulk, detracting from portability. If the printing calculator is to be used to record transactions, the paper roll is inconvenient for on-hand storage and quick reference. If printing is desired on forms with varying formats, conventional printing calculators are totally inadequate.

For instance, U.S. Pat. No. 3,920,979 provides a calculator for the purposes of printing checks and recording their issue. The motor, gears and paper roll result in a device too large to be carried constantly for convenient use. To refer to previous transactions, the device must be opened and the paper roll unraveled. Two printheads are required so that both checks and recordal medium can be printed. No provision at all is made for printing deposit slips.

In the absence of a convenient transaction printing calculator, manual processes have been used, which have led to frequent errors, both of calculation and omission. A non-printing calculator may be utilized, but this adds time and effort rather than lessening them, and still does not prevent the user from neglecting to record a transaction once it has been made.

Therefore, a long standing need has existed to provide an improved portable printing means including calculating means which would assure maintenance of properly computed balances, print pertinent information onto recordal sheets as well as various transaction forms and still be compact, efficient and convenient.

SUMMARY OF THE INVENTION

Accordingly, the above problems and difficulties are obviated by the present invention which satisfies the foregoing needs and requirements. The present printing calculator device includes a removable carriage means slidably carried on a support over a pad of sheets which constitute a printing medium. A calculator is mounted on the carriage or fixly secured to the support. The carriage may be assembled with the support over any sheet in the pad, thus allowing for multiple forms and for use of remaining recordal sheets as they are expended. Included on the carriage means is a printing means whereby lateral or sideways motion of a printhead carried thereon is made operative for creating or recording transactional information. A feature resides in the provision of a timing means associated with the printing means which is operated by sensing the linear progress of the printhead relative to the sheets upon which it is printing. In one form, the printing means employs a wheel which rolls against a rack on a guide rail slidably supporting the carriage means, while in another embodiment, magnetic means are employed.

Elimination of conventional motors and drive gears reduces the size and cost of the inventive device.

Therefore, it is an object of the present invention to provide a portable printing calculator for use with multiple forms to aid in personal accounting procedures which includes memory means, printing means, timing means, and calculating means. In addition, a machine readable record may be kept of all transactions.

Another object of the present invention is to provide a novel printing calculator device whereby information may be printed onto the face of a transaction sheet followed by the removal of the printing means from the sheet area for reassembling with an alternate recordal sheet for effectively transferring the information thereto subsequent to the initial printing.

Yet another object of the present invention is to provide a portable calculating, printing and memory device including a calculator and printing means which maintains a running summation of all transactions for ready recall and which is adapted for being carried on the person using the device.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view showing the novel transaction writer and recordal device of the present invention;

FIG. 1A is a perspective view of the device illustrated in a closed or storage condition;

FIG. 2 is a top plan view of a typical transaction as filled out with information printed by the novel transaction writer and recordal device incorporated herein;

FIG. 3 is an enlarged plan view, partly broken away to illustrate the printhead and storage medium as well as a photo-electric timing means which is incorporated into the embodiment shown in FIG. 1;

FIG. 4 is a transverse cross-sectional view of the device shown in FIG. 3 as taken in the direction of arrows 4—4 thereof;

FIG. 5 is a sectional view of the timing means shown in FIG. 3 as taken in the direction of arrows 5—5 thereof;

FIG. 6 is a perspective view of the calculator and printhead or medium plate illustrating the sliding coupling to the support plate;

FIGS. 7 and 8 are fragmentary views of another embodiment of the present invention incorporating a magnetic timing means for the printing medium; and FIG. 9 is a block diagram of the electronic circuitry for use in the portable transaction writer and recordal device of FIG. 1.

DESCRIPTION OF PREFERRED EMBODIMENT

Referring to FIG. 1A, the novel calculating, transaction writer and recordal device of the present invention is indicated in the general direction of arrow 10 which includes a base having a pair of flaps 11 and 12 which are joined together at adjacent sides by a hinge portion 13. The flaps 11 and 12 serve to support a pad of transaction sheets such as checks, for example, and a pad or block or recordal sheets between the opposing surfaces of the flaps 11 and 12. The device is illustrated in its folded position in FIG. 1A and a snap means 14 is employed for maintaining the flap covers in a storage position. When it is desired to use the device, the snap means 14 is decoupled and the flaps are opened to expose the components of the device.

Referring now in detail to FIG. 1, the cover of device 10 has been opened by revolving flaps 11 and 12 about the integral hinge portion 13 so as to expose a pad of transaction sheets indicated by numeral 15 and a block or pad of recording sheets collectively indicated by numeral 16. The pad of transaction sheets are removably carried on a flat platen such as identified by numeral 17 in FIG. 4 so as to provide a surface maintaining the paper flat during a subsequent printing operation. A sliding carriage 20 having a calculator thereon includes downwardly depending rails 21 and 22 which extend along the opposite sides of the carriage 20 and are slidably mounted on a pair of spaced apart guide rails 23 and 24 carried on the platen 17. The four rail assemblage in sliding relationship maintains the sliding calculator carriage 20 on a straight horizontal line during the printing procedure. The guide rails have ridges forming grooves into which the tongues of the carriage rails slide so as to hold the carriage case down to the platen. Such a tongue in groove arrangement is shown in FIG. 4 wherein a tongue 25 carricd on the side rail of the carriage is engaged in a groove on the guide rail 23.

The electronic circuitry including a computer is carried on the sliding carriage 20 and is generally illustrated by the numeral 27 and includes a directly connected keyboard having alpha/numeric characters printed thereon for the use of the operator. A typical key is indicated by numeral 28 and an eight segment display is indicated by numeral 30. An eight character LCD may be employed as is commonly in use in pocket calculators. The display is used for numerics and a limited vocabulary of alphabetics to guide the user in the operation of the device. For example, the word "register" is displayed in FIG. 3 to indicate that it is time for the register to be printed on the recordal sheet. In other instances the display can be employed for displaying a transaction number as shown in FIG. 1. The electronic circuitry employs a typical micro computer having the part number or nomenclature Nippon Electric Co. $\mu$ PD 7502. The micro computer includes a a memory having sufficient static RAM (128×4) to contain the data required such as current balance, transaction serial, print-out data, etc. Also included is an on-board LCD controller/oscillator and ample ROM (2096×8) to contain the program and dot matrix character tables. The chip is made with the low-power-consumption CMOS process and has a power-down mode to conserve batteries when not in use.

The ON side of the "on-off" switch 64 is connected to the reset pin of the micro computer. The OFF side is connected to interrupt number 1. The keyboard, magnetic read/write head, the magnetic read timing head, and the thermal (or electrostatic) printhead are connected to the appropriate I/0 pins by interface circuitry where required and the read/write head is indicated by numeral 33 while the printhead is indicated by numeral 34. The connection for the LCD is described in appropriate literature for the above specified micro computer chip.

The printhead 34 and the mass-storage magnetic read/write head 33 are resiliently mounted on springs between top and bottom plates 49 and 59 within holders 19 and 29 respectively as shown more clearly in FIG. 4 so as to keep the heads in contact with the paper which may be at various heights depending upon the stage of use. Batteries may be of conventional coin type or single size AAA with a transformer to raise the voltage to five volts.

Timing signals are required for the printing operation and printer timing is effected by measuring the progress or displacement of the printhead relative to the paper. Such timing is achieved by means of a timing rack 35, in FIG. 3, formed in a lateral facing portion of the tongue along the guide rail 24 which is meshed with a contact wheel or pinion 36 carried on the edge marginal region of the sliding calculator carriage 20. Therefore, as the plate is moved, the pinion 36 will be turned because of the rack 35 causing gear wheel 37 to rotate accordingly. Gear 37, in turn, operates a timing wheel 38. A plurality of apertures are provided along the edge marginal peripheral area of the timing wheel 38 and such an aperture is indicated by numeral 40. A light emitting diode is operably mounted on the sliding calculator carriage 20 and is indicated by numeral 41. As shown in FIG. 4, a photo diode is indicated by numeral 42 which is activated by a light passing through apertures in the timing wheel 38 from the LED 41.

Before printing, the micro computer 43 sets up a string of indexes. Each index points to a character in a dot matrix table, or to a word which in turn consists of a string of indexes to characters. As each timing signal is received, the micro computer selectively activates the elements of the printhead, then steps forward to the next column in the dot matrix table. As each character is completed, the micro computer steps to the next character and resets the column counter.

FIG. 1 also illustrates that the pad of recording sheets 16 is carried between a second set of guide rails identified by numerals 50 and 51 respectively which are retained on a flat platen 52. At least one of the guide rails such as guide rail 51 includes a plurality of teeth forming a rack 53 which mesh with the contact wheel 36 when the calculator carriage 20 has been removed from the rails 23 and 24 and placed over the rails 50 and 51. Therefore, the information which has been recorded and stored by the computer 43 can be transferred not only to a transaction sheet in the pad of transaction sheets 15 but can be put on the recordal sheet 16 in the same manner. The recordal sheet may be provided with magnetic strip 54 for recording special information while the remaining surface of the recordal sheet may include space for printing transaction number, amount, new balance, date, etc. The transaction sheets are provided with perforations along the left edge for ease in dispensing them, whereas the recordal sheets consist simply of a bound pad.

In FIG. 2, a typical transaction in the form of a check is illustrated. The alpha/numeric information printed by the printhead 34 is illustrated on the amount line identified by numeral 56 which includes the amount written in alpha print followed by numerical print for cents and date as well as numeric amount numerals. The same information is stored in the memory of the calculator and is applied to the recordal sheet as previously noted.

Referring to FIGS. 5 and 6, it can be seen that the electronic circuitry 27 is on a printed circuit board disposed on the under side of the top plate 49 of the carriage 20 and that the read/write head 33 as well as the printhead 34 protrude through the bottom of plate 59 between the side rails 21 and 22. The read/write and printheads as well as the ON/OFF switch are connected to the computer via interface circuitry. Also, it can be seen that the grooves of the rails are available for receiving the tongues as previously described in connection with FIG. 4 where the tongues 25 and 26 are received in the grooves of the rails 23 and 24.

Referring to FIGS. 7 and 8, another embodiment of the invention is shown which employs permanent magnets embedded in the lower guide rail of each pair that provide timing signals for the printing operation. A magnetic read head indicated by numeral 60 slides over the plurality of spaced apart magnets indicated by numeral 61 on the rail which sends signals to the micro computer or processor. Such construction eliminates the need for mechanical gearing such as racks and gears and the photo electric system previously described.

In the LED embodiment, the switch components 31 and 32 are employed to provide a signal to the micro computer or processor that the operator has commenced to slide the carriage for printing and that the contact wheel is fully engaged with the rack. In response to this signal, the micro computer turns on the LED.

In FIG. 9, it can be seen that the micro computer 43 is the electronic interconnection between the keyboard 63 and the printhead 34 as well as the magnetic read/write head 33. The photo diode 42 operates in conjunction with the LED 41 via the micro computer. The start switch incorporating the components 31 and 32 operate when the carriage plate 20 is moved, signaling the micro computer that printing has started.

Now, the operation of the calculator will be illustrated, giving as an example its use as an automated checkbook. To operate the device 10, the user releases the snap 14, opens the flap 11 and slides the on-off switch 64 to the ON position. The calculator displays the current date on the LCD 30 (unless a register entry is outstanding, as described below).

To write or print a check, the user enters the amount on the keyboard 63, then presses any function key (CR, DR, DEP, or BAL). The calculator or computer displays the amount as it is entered, placing the decimal between the dollars and cents. When the function key is pressed, the calculator displays the letters "CH" and the current check number. The keyboard is now locked. The user slides the calculator carriage 20 to the right along the guide rails 23, 24. The calculator prints the alphabetic amount, the date, and the numeric amount via the printhead 34, then displays the word 'REGISTER.' The user finds the next available page in the register pad 16, slips the carriage between the register pages and over the register guide rails 50 and 51, then slides the carriage to the right along the rails. The calculator encodes a transaction code, the check serial and the amount on the magnetic strip 54, and simultaneously prints the current date, the check number, amount and new balance. The user slides the switch 64 to the OFF position and sets it aside, enters the payee on the register and the payee and his signature on the check 15 in pen. He then dispenses the check, places the calculator carriage 20 on the check guide rails 23 and 24 and closes and snaps the cover.

To make a deposit, the user removes the calculator carriage 20 and pages down to an available deposit slip. He places the calculator over the deposit slip and presses the 'DEP' key. The calculator displays the word 'DEPOSIT.' The user enters the amount, then presses any function key. The calculator displays the amount as it is entered with the decimal point. When the function key is pressed, the calculator displays the words 'DEP SLIP.' The keyboard is now locked. The user slides the carriage along the check guide rails. The calculator prints the date and the numeric amount, then displays the word 'REGISTER.' Register printing proceeds as above except that the calculator encodes the amount as negative and the date instead of the serial on the magnetic strip, and prints the letters 'DEP' instead of a check number.

The 'DR' transaction is used to enter bank charges, withdrawals from automatic teller machines and other miscellaneous debits. The user presses the 'DR' key. The calculator displays the word 'DEBIT.' The user enters the amount, then presses any function key. The calculator displays the amount as it is entered with the decimal point. When the function key is pressed, the word 'REGISTER' is displayed. Register printing proceeds as for a check, except that the calculator prints the letters 'DR' and encodes the date instead of printing or encoding a check number.

The 'CR' transaction is used to enter miscellaneous credits (such as interest payments, if the user has interest checking). The user presses the 'CR' key. The calculator displays the word 'CREDIT.' The rest of the transaction is the same as for a debit, except that the calculator encodes the amount as negative and prints 'CR' instead of 'DR.'

If the user makes an error when entering a numeric figure in any of the above transactions, he may press the clear ('C') key. The calculator displays the current date and the user may retry from the beginning. If the keyboard is locked (the user has already pressed the final function key), the user must turn the calculator off and back on again while pressing the 'C' key.

To void a transaction, the user presses the 'VOID' key. The words 'SCAN REG' are displayed. The user passes the carriage over the register entry for the transaction to be voided. The calculator reads the data and prints an 'X' in the check-off box 39, then displays the word 'REGISTER.' The user finds the next available register page and passes the carriage over it. The calculator prints the word 'VOID,' the scanned data, the adjusted current balance, and an 'X' in the check-off box.

The 'BAL' transaction is used to reconcile the checkbook with the monthly statement from the bank. When the user receives his statement, he enters all debits and credits as described above. He writes a checkmark in the check-off box for each transaction that has passed the bank, including the debits and credits just entered. He then presses the 'BAL' key. The calculator displays the current balance. The user searches through the register pad for all transactions that have got passed the bank (no checkmark). For each outstanding transaction, the user slips the carriage between the register pages and over the register guide rails, then slides the carriage to the right. The calculator reads the magnetic encoding and adds the amount to the display balance. When all outstanding transactions have been read, the display balance should equal the statement balance.

When new batteries are installed, the current check number, the current balance, date and time must be initialized. To begin, the user turns on the calculator while depressing the 'C' key. The calculator displays the word 'SERIAL.' The user enters the next available check number, then presses any function key. The calculator displays the serial as it is entered and stores it in memory when the function key is pressed. The calculator will subsequently display the words 'BALANCE,' 'DATE,' and 'TIME,' so that they may be similarly initialized.

If the user neglects to turn the calculator off, the calculator will time out after a while, and turn itself off. If a register print action was pending at the time, or if the user turns the calculator off manually with a register print action pending, the calculator will display the word 'REGISTER,' as before, when the calculator is turned back on. This may also occur when new batteries are installed, in which case the user should turn the calculator on while pressing the 'C' key.

The printer will not operate properly if the user slides the carriage across the page too fast. The calculator may include sufficient drag so that this will not occur in normal circumstances without concerted effort.

A motorless printer has been illustrated as the preferred embodiment because of its advantages in conserving space and weight. More conventional printers may easily be devised which are larger and heavier, but may still take advantage of the multiform output means disclosed.

Also, it has been assumed that the batteries, LCD, keyboard and micro-computer would be mounted on the sliding carriage as shown. All or some of these parts may be mounted elsewhere, for instance, on the top platen, with a cable leading to the printhead mounted on the carriage. Such an arrangement has no particular advantage over the arrangement shown.

While particular embodiments of the present invention have been shown and described, it will be obvious to those skilled in the art that changes and modifications may be made without departing from this invention in its broadest aspects and, therefore, the aim in the appended claims is to cover all such changes and modifications as fall within the true spirit and scope of this invention.

What is claimed is:

1. A portable printing calculator comprising the combination of:

a calculating means;

a printing medium;

a printing means for printing information on said printing medium under control of said calculating means;

guidance means operably disposed between said printing means and said print medium for guiding the path of said printing means along a line parallel to an edge of said printing medium;

said printing medium consists of pads of leaves, bound at one edge;

said printing means insertable between any pair of said leaves for printing of said information;

said calculating means includes an input means coupled to a memory means for entering information thereto;

said printing means is operative to print the information derived from said memory means; and said printing medium consists of two pads, one of which has perforations along said bound edge.

2. A printing calculator as defined in claim 1 wherein:

said printing medium includes a thermally sensitive area.

3. A printing calculator as defined in claim 1 wherein:

said printing medium includes an electrosensitive area.

4. A portable printing calculator comprising the combination of:

a calculating means;

a printing medium;

a carriage means movably carried on said printing medium;

printing means mounted on said carriage means under control of said calculating means for recording information on said printing medium in response to movement of said carriage means;

said calculating means includes as input means coupled to a memory means for entering information thereto;

said printing means being operative to print the information derived from said memory means;

a timing means disposed between said printing medium and said carriage means for sensing the linear movement of said calculating means with respect to said printing medium;

said calculating means is mounted on said carriage means;

a gear and rack arrangement disposed between said printing medium and carriage means constituting a slidable support therebetween; and said timing means includes a photoelectric arrangement interacting between said carriage means and said gear and rack arrangement.

5. The invention as defined in claim 4 including:

magnetic recording means operably carried on said carriage means; and a magnetic strip carried on said printing medium for recording transactional information in response to said magnetic recording means.

6. The invention as defined in claim 4 wherein:

said printing medium is a pad of paper sheets wherein any sheet of said pad may be exposed to record said transactional information.

7. A printing medium for use with a printing calculator as defined in claim 26 including:

a pad of leaves bound at one edge with perforations along said bound edge; and preprinted titles on each of said leaves identifying the information to be printed by said printing calculator.

8. A printing medium as defined in claim 7 including:

a thermally sensitive area carried on each of said leaves.

9. A printing medium as defined in claim 7 including:

an electrosensitive area carried on each of leaves.

10. A printing medium for use with a printing calculator as defined in claim 26 including:

a pad of leaves bound at óne edge;

a magnetic strip carried on each of said leaves for receiving information encoded by said printing calculator; and preprinted titles on each of said leaves identifying the information to be printed by said printing calculator.

11. A printing medium as defined in claim 10 including:

a thermally sensitive area carried on each of said leaves.

12. A printing means as defined in claim 10 including:

an electrosensitive area carried on each of said leaves.

13. The invention as defined in claim 4 wherein:

said printing means includes a printhead slidably moved along said carriage means; and said calculating means operates said printhead in response to the linear sensing of carriage means movement with respect to said printing medium.

14. The invention as defined in claim 13 including:

guide means disposed between said carriage means and printing medium permitting linear movement of said carriage.

15. The invention as defined in claim 13 including:

a base supporting said printing medium in the form of a pad of paper sheets and a pad of recording sheets in spaced apart relationship:

slider means carried on opposite sides of said carriage means; and guide means carried on said base adjacent each of said pads for slidably receiving said carriage slider means whereby the transactional information is transferred from said printing means via said printhead to selected areas on a sheet of said pad of paper sheets and on a record sheet of said pad of record sheets.

16. The invention as defined in claim 15 wherein:

said timing means includes a movement sensing means carried on said slider means and on said guide means coordinated with selected areas on said checks and record sheets for imprinting the transactional information thereon.

* * * * *